(12) United States Patent
Ghosh et al.

(10) Patent No.: US 7,340,452 B2
(45) Date of Patent: *Mar. 4, 2008

(54) PARALLEL SINGLE CURSOR MODEL ON MULTIPLE-SERVER CONFIGURATIONS

(75) Inventors: Bhaskar Ghosh, Burlingame, CA (US); Thierry Cruanes, Redwood City, CA (US); Benoit Dageville, Foster City, CA (US); Shrikanth Shankar, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 451 days.

This patent is subject to a terminal disclaimer.

(21) Appl. No.: 10/901,411

(22) Filed: Jul. 27, 2004

(65) Prior Publication Data

US 2005/0131879 A1    Jun. 16, 2005

Related U.S. Application Data

(63) Continuation-in-part of application No. 10/824,887, filed on Apr. 13, 2004, and a continuation-in-part of application No. 10/841,991, filed on May 6, 2004, and a continuation-in-part of application No. 10/865,178, filed on Jun. 9, 2004.

(60) Provisional application No. 60/530,413, filed on Dec. 16, 2003.

(51) Int. Cl.
*G06F 17/30* (2006.01)

(52) U.S. Cl. ............................... 707/3; 707/4
(58) Field of Classification Search ...................... None
See application file for complete search history.

(56) References Cited

U.S. PATENT DOCUMENTS

| 4,769,772 | A |  | 9/1988 | Dwyer |
| 4,860,201 | A |  | 8/1989 | Stolfo et al. |
| 5,325,525 | A |  | 6/1994 | Shan et al. ................. 718/104 |
| 5,765,146 | A |  | 6/1998 | Wolf et al. .................... 707/2 |
| 5,822,750 | A |  | 10/1998 | Jou et al. |
| 5,835,755 | A |  | 11/1998 | Stellwagen, Jr. |
| 5,857,180 | A |  | 1/1999 | Hallmark et al. |
| 5,864,839 | A |  | 1/1999 | Bourgoin |
| 5,937,401 | A | * | 8/1999 | Hillegas |
| 6,081,801 | A | * | 6/2000 | Cochrane et al. ............... 707/3 |
| 6,085,189 | A |  | 7/2000 | Pirahesh et al. |
| 6,112,198 | A |  | 8/2000 | Lohman et al. |
| 6,289,334 | B1 |  | 9/2001 | Reiner et al. |
| 6,411,951 | B1 |  | 6/2002 | Galindo-Legaria et al. |
| 6,466,931 | B1 | * | 10/2002 | Attaluri et al. ................. 707/2 |
| 6,529,901 | B1 | * | 3/2003 | Chaudhuri et al. ............ 707/3 |
| 6,625,593 | B1 |  | 9/2003 | Leung et al. |

(Continued)

*Primary Examiner*—John Breene
*Assistant Examiner*—Thu-Nguyet Le
(74) *Attorney, Agent, or Firm*—Hickman Palermo Truong & Becker LLP

(57) ABSTRACT

A cursor that is generated from an original database statement includes a master plan that is shared among the various participants involved in the parallel execution of the operations specified in the original statement. For participants that cannot share the same cursor, such as slave processes on remote servers, a remote cursor is generated. Signatures are generated for both the master plan and the remote plans, and compared to ensure that the remote plans are equivalent to the master plans. Various parameters and statistics are provided to remote servers to increase the likelihood that the remote plans will be equivalent to the master plan.

46 Claims, 3 Drawing Sheets

U.S. PATENT DOCUMENTS

| | | | |
|---|---|---|---|
| 6,721,724 B1 * | 4/2004 | Galindo-Legaria et al. | 707/2 |
| 6,910,032 B2 | 6/2005 | Carlson et al. | |
| 6,928,451 B2 * | 8/2005 | Mogi et al. | 707/102 |
| 6,954,776 B1 | 10/2005 | Cruanes et al. | |
| 6,968,335 B2 | 11/2005 | Bayliss et al. | |
| 7,020,661 B1 | 3/2006 | Cruanes et al. | |
| 7,051,034 B1 | 5/2006 | Ghosh et al. | 707/100 |
| 7,089,356 B1 | 8/2006 | Chen et al. | |
| 2002/0038300 A1 | 3/2002 | Iwata et al. | |
| 2003/0055813 A1 | 3/2003 | Chaudhuri et al. | 707/3 |
| 2003/0065644 A1 * | 4/2003 | Horman et al. | 707/1 |
| 2003/0187831 A1 | 10/2003 | Bestgen et al. | |
| 2003/0208489 A1 | 11/2003 | Todd | |
| 2003/0229640 A1 | 12/2003 | Carlson et al. | |
| 2004/0172626 A1 | 9/2004 | Jalan et al. | |
| 2005/0049996 A1 | 3/2005 | Srinivasan et al. | |
| 2005/0131890 A1 | 6/2005 | Cruanes et al. | 707/4 |
| 2005/0132383 A1 | 6/2005 | Ghosh et al. | 719/312 |

* cited by examiner

PARALLEL SINGLE CURSOR MODEL ON MULTIPLE-SERVER CONFIGURATIONS

PRIORITY CLAIM/RELATED CASES

This application claims the benefit of priority from U.S. Provisional Application Ser. No. 60/530,413, entitled "Parallel Shared Cursors" filed Dec. 16, 2003, which is incorporated by reference in its entirety for all purposes as if fully set forth herein.

This application is a continuation-in-part of U.S. patent application Ser. No. 10/824,887, entitled "COMPILATION AND PROCESSING A PARALLEL SINGLE CURSOR MODEL", filed on Apr. 13, 2004, the contents of which are incorporated herein, in their entirety, for all purposes.

This application is a continuation-in-part of U.S. patent application Ser. No. 10/841,991, entitled "EXECUTING FILTER SUBQUERIES USING A PARALLEL SINGLE CURSOR MODEL", filed on May 6, 2004, the contents of which are incorporated herein, in their entirety, for all purposes.

This application is a continuation-in-part of U.S. patent application Ser. No. 10/865,178, entitled "COMMUNICATING EXTERNAL EXPRESSIONS USING A PARALLEL SINGLE CURSOR MODEL", filed on Jun. 9, 2004, the contents of which are incorporated herein, in their entirety, for all purposes.

This application is related to:

U.S. patent application Ser. No. 10/898,300, entitled "DYNAMIC PERFORMANCE VIEWS WITH A PARALLEL SINGLE CURSOR MODEL", filed on Jul. 23, 2004;

U.S. patent application Ser. No. 10/930,433, entitled "EXECUTING NESTED SUBQUERIES OF PARALLEL TABLE FUNCTIONS IN THE PARALLEL SINGLE CURSOR MODEL", filed on Aug. 30, 2004;

U.S. patent application Ser. No. 10/944,175, entitled "EXECUTING A PARALLEL SINGLE CURSOR MODEL", filed on Sep. 16, 2004;

the contents of all of which are incorporated herein, in their entirety, for all purposes.

FIELD OF THE INVENTION

The present invention relates to managing data and, more specifically, to parallelizing operations that involve managing data in multiple-server systems.

BACKGROUND

Database applications interact with a database server by submitting to the database server commands that cause the database server to perform operations on data stored in a database. A database command that is sent from a database application to a database server contains the "original statement" of the database command.

For the database server to process the commands, the commands must conform to a database language supported by the database server. One database language supported by many database servers is known as the Structured Query Language (SQL).

When a database server receives the original statement of a database command from a database application, the database server must first determine which actions should be performed in response to the database command, and then perform those actions. The act of preparing for performance of those actions is generally referred to as "compiling" the database command, while performing those actions is generally referred to as "executing" the database command.

Various database languages, such as SQL, support special-purpose constructs referred to herein as "cursors". During the compilation of a query statement, the database server may perform a significant amount of preliminary work for the statement, such as parsing, semantic analysis, and query plan generation. A cursor stores the results of much of this preliminary work. For example, one set of information stored in a cursor includes the execution plan for performing the operations specified by the SQL statement.

One method of representing an execution plan is a row-source tree. At execution, traversal of a row-source tree from the bottom up yields a sequence of steps for performing the operation(s) specified by the SQL statement. A row-source tree is composed of row-sources. During the compilation process, row-sources are allocated, and each row-source is linked to zero, one, two, or more underlying row-sources. The makeup of a row-source tree depends on the query and the decisions made by a query optimizer during the compilation process. Typically, a row-source tree is comprised of multiple levels. The lowest level, the leaf nodes, access rows from a database or other data store. The top row-source, the root of the tree, produces, by composition, the rows of the query that the tree implements. The intermediate levels perform various transformations on rows produced by underlying row-sources.

The row-source tree representation of execution plans is described in detail in U.S. Pat. No. 5,857,180, entitled "Method and apparatus for implementing parallel operations in a database management system", issued to Hallmark et al on Jan. 5, 1999, the entire contents of which are incorporated herein. Hallmark also describes a "row-source approach" for parallelizing the operations required by an SQL command by parallelizing portions of the execution plan of the query. The row-source approach to parallelizing queries is described in greater detail below.

Parallel Execution of a Query Using Slave SQL

Sequential query execution uses one processor and one storage device at a time. In contrast, parallel query execution uses multiple processes to execute, in parallel, suboperations of a query. For example, virtually every query execution includes some form of manipulation of rows in a relation, or table of the database management system (DBMS). Before any manipulation can be done, the rows must be read, or scanned. In a sequential scan, the table is scanned using one process. Parallel query systems provide the ability to break up the scan such that more than one process can get involved in performance of the table scan.

Various techniques have been developed for parallelizing queries. Such techniques typically rely on an underlying query processing model. For example, one model (a "row-source model") for parallelizing queries is described, in U.S. Pat. No. 5,857,180, which was mentioned above. According to the row-source (iterator) model of SQL execution, data flows through the SQL operations modeled by a row-source in the form of row-vectors. Specifically, a parallel plan is built on the Query Coordinator (QC). The parallel plan is subdivided into sub-plans or sub-trees, each called a DFO (Data Flow Object), each of which are scheduled and run in parallel on a set of parallel execution slaves.

One of the main design issues in any parallel SQL execution engine is how to express and communicate these tasks or sub-plans to the parallel slave processes. According to one implementation of the row-source model, a specialized form of SQL, called slave SQL, is used to express such tasks or sub-plans. Slave SQL is standard SQL plus some extensions to support notions like data partitioning and flow of partitioned data from one DFO to another.

According to the same approach, the slave SQL, corresponding to each DFO, is sent to slaves. Upon receiving a slave SQL command, a slave compiles the slave SQL and executes the slave SQL using control information sent from the QC. The global parallel plan has a SQL cursor corresponding to each Data Flow Object (DFO). So, running a parallel query involves parsing, unparsing and executing a parallel cursor on the QC side and parsing and executing on a slave set one cursor per DFO.

When compiled by slaves, the DFO cursors expressed in slave SQL often generate special row-sources that a QC plan would never show. Given the complexity of this picture, parallel queries can be hard to manage, monitor and tune. Also, generating slave SQL for each DFO from the physical execution plan (comprising of row-source plus some parallel annotation) is difficult and error-prone, since the compilation structures get manipulated and transformed extensively after the high level SQL gets parsed, semantic-checked, optimized and compiled into the physical row-source plan.

As explained above, slave SQL is a means to generate the correct execution plan on the slave. To do this the database server has to add, parse and maintain special slave SQL constructs such as group-by staging operators, bitmap index specific operators, etc. Supporting slave SQL requires specialized slave-specific support from parsing all the way through execution. The amount of slave-specific support required to support the slave SQL approach results in a preponderance of slave specific code and has historically caused a large number of bugs. In addition, the new constructs required by slave SQL have to be SQL expressible.

As mentioned above, one step in the generation of the slave SQL statements that are sent to the slave sets is the unparsing of the row-source tree created for the original statement, and the data-flow operators contained therein. Such unparsing operations are difficult and error-prone. Typically, the database server has to generate a (supposedly implementation free) high level representation of the operations represented by each of the data flow operators. Within a relational database system that supports the SQL language, it is natural that the SQL language is used to express such high level representations of dataflow operators.

Thus, while the original statement is parsed to derive the query plan, portions of the query plan must be "un-parsed" to produce slave SQL statements. Unfortunately, by the time the database server reaches the post-compilation phase, when unparsing for slave SQL is performed, the compilation process has modified or moved around information (e.g. predicates) that needs to be gathered together again to correctly regenerate a query. This unparsing process is very specific to the parallel execution engine and requires statement-specific support, which can be cumbersome and error-prone.

In addition, using the slave SQL approach, parallelization of new SQL operations is usually done well after the design and implementation of the serial operation. Some of the decisions taken in the compilation layers for the serial implementation (which is based on the original statement) can contradict the requirements of generation and support for slave SQL.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview of Parallel Shared Cursor

Techniques shall be described hereafter for executing queries, or portions thereof, in parallel, in a multiple-server environment, without using slave SQL to communicate to each slave the operations to be performed by the slave. Instead of generating one cursor for the query coordinator (QC) based on the original statement, and separate cursors for each DFO based on the slave SQL, the techniques involve sharing either (1) the cursor that is generated from the original statement, or (2) an equivalent cursor, among the various participants involved in the parallel execution of the operations specified in the original statement. The model used by these techniques is referred to herein as the "Parallel Shared Cursor" (PSC) model of processing, in parallel, the operations specified in SQL queries.

The Parallel Shared-Cursor (PSC) based model provides a simpler and more manageable architecture for parallel SQL cursors. Specifically, in the PSC model, the database server builds a single cursor that contains the information needed for parallel execution, and is used for the entire parallel execution process, by both the QC and the slaves on a single instance of the database server where cursor sharing is possible. Because QC unparsing and slave parse support for slave SQL is no longer required, the support of new features, monitoring of query progression, and diagnosability of query performance, become better.

Example System

Figure 1:
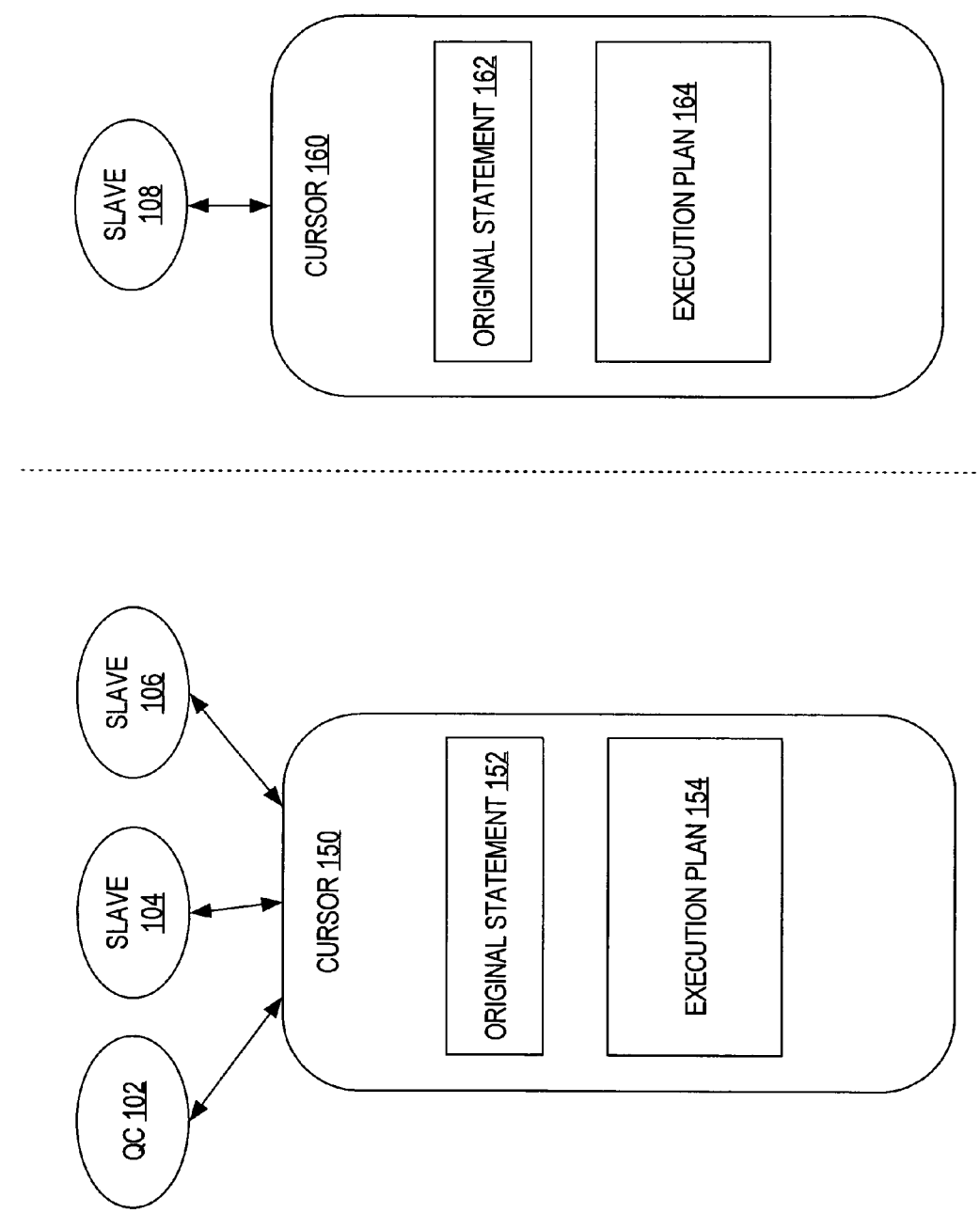
FIG. 1 is a block diagram illustrating a system in which slave processes perform work based on shared cursors and equivalent cursors, according to an embodiment of the invention.

FIG. 1 is a block diagram of a system in which a single cursor is shared between several processes, according to an embodiment of the invention. Specifically, a cursor 150 has been generated by a database server based on a database statement received from a database application. In the illustrated embodiment, the cursor 150 includes the original statement 152 of the database command (typically a SQL statement) for which the cursor 150 was generated. In addition, the cursor 150 includes an execution plan 154 that describes a plan for accomplishing all of the operations specified by the original statement 152 (herein referred to as the "complete execution plan").

For the purpose of explanation, it is assumed that the database statement specifies one or more operations that can be parallelized. Consequently, the cursor 150 containing the complete execution plan is made available to a query coordinator 102 to allow the query coordinator 102 to coordinate the parallel execution of those operations.

The query coordinator 102 coordinates the parallel execution of an operation by providing to slave processes information that causes each of the slave processes to perform a portion of the parallel operation. However, the information provided to the slave processes is not in the form of slave SQL that must be separately parsed and compiled by the slave processes. Rather, as illustrated in FIG. 1, the cursor 150 that contains the execution plan 154 used by the QC is made available to the slaves. Specifically, FIG. 1 illustrates a scenario in which two slaves 104 and 106 have access to the same instance of the cursor 150 that is being used by the query coordinator, and one slave 108 that has access to a separate instance of a cursor 160 which, as shall be explained in greater detail hereafter, is an equivalent of cursor 150.

Regardless of whether a slave has access to the same cursor instance as the query coordinator, or to an instance of an equivalent cursor, the slave is privy to the same information. Significantly, that information is already in compiled form, thus avoiding the need for each slave to separately parse and compile their own cursors based on SQL fragments. Further, the information thereby available to each slave includes the complete execution plan, and is not limited to the portion of the plan that is specific to the role of that particular slave in the execution of the plan. Because the slave is exposed to this information, the slave can make intelligent decisions with respect to how to execute its portion of the plan. For example, a slave may determine how it will execute its portion of the plan based, in part, on some characteristic of the original statement. As another example, a slave may determine how it will execute its portion of the plan based, in part, on portions of the execution plan that will be executed by other slave processes.

The Complete Execution Plan

According to one embodiment, because the slaves are to perform their assigned tasks based on the shared execution plan, all the constructs used for the execution of a parallel statement are expressed as row sources in the physical plan. Consequently, there need not be any other representation of this complete execution plan, and the same representation is used by the execution engine, both in the QC and the parallel execution slaves. Constructs that may be used to supplement an execution plan to provide support for execution of the parallel statement shall be described in detail hereafter.

During the compilation of the original SQL statement, the optimizer within the database server generates a logical execution plan in multiple passes. According to one embodiment, in the first pass, the join order and access methods are picked to minimize the parallel cost of a plan (analogous to total system usage cost) given the degree of parallelism (DOP) specified for each object in the query. While computing the parallel cost of a plan in this pass, the database server takes various parallel characteristics into account, such as number of nodes, number of partitions (table or index fragment) of each object, and the default distribution method.

In the second pass, the optimizer computes the best distribution method for each operation in the parallel plan. The result is a logical representation of the execution plan which is then compiled into a tree-based representation of physical operators (row-sources). In this phase, the database server also clumps row sources into DFO's and performs some physical optimizations taking into account specific knowledge of the requirement of the operator such as clustering, ordering or data fragmentation. The process of clumping row sources is typically performed while building the row source tree for the execution plan of the statement. Clumping generally involves grouping neighboring row sources to encapsulate or define a connected component of the plan tree which will be executed on a single slave process as a single piece. Clumping is used by the database server to define DFOs. When two neighboring row sources in the plan tree are not clumped together, they belong to different DFOs (i.e., there is a DFO boundary between them).

Figure 2:
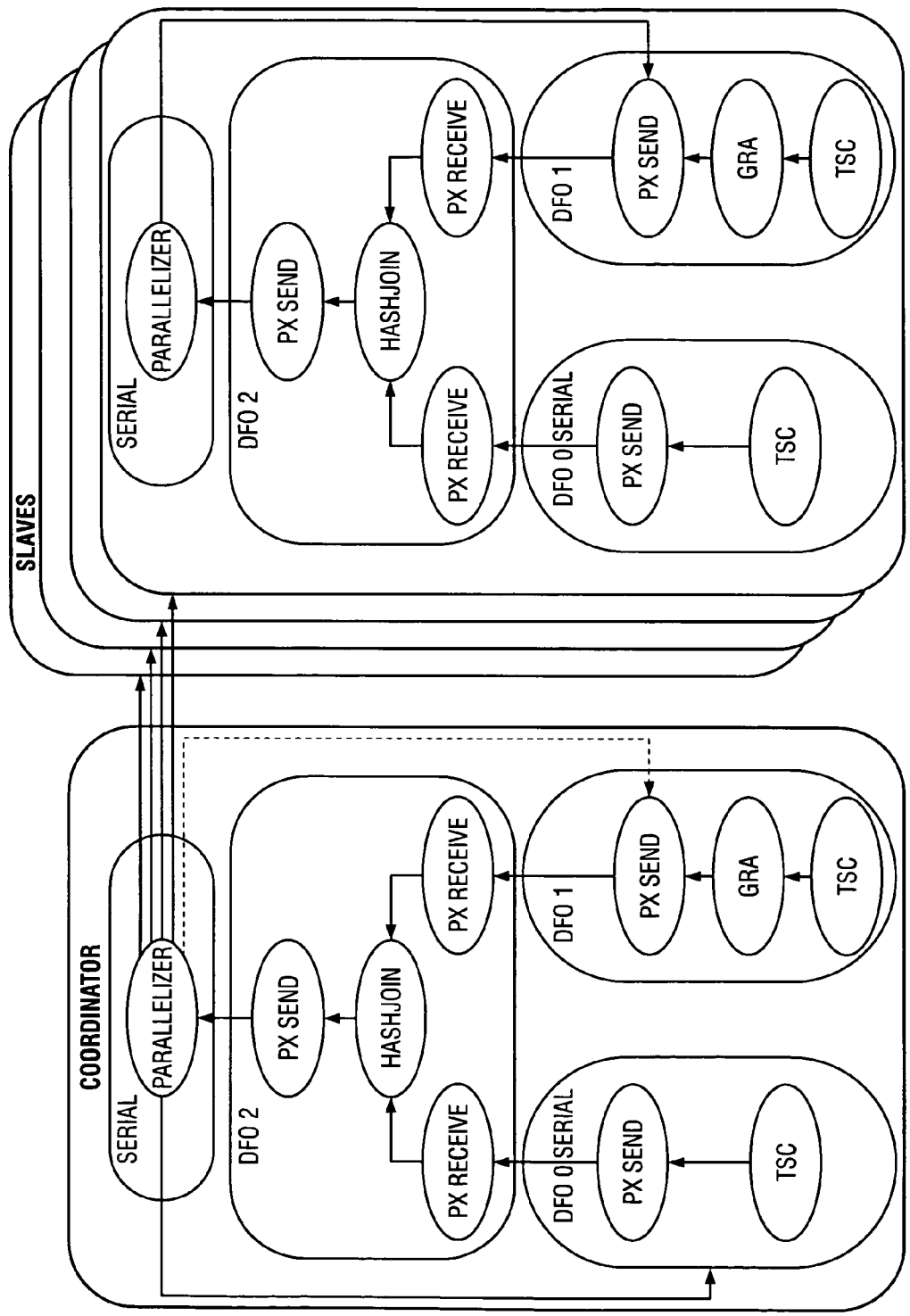
FIG. 2 is a block diagram illustrating slave processes that have access to an entire execution plan of a query, according to an embodiment of the invention.

FIG. 2 is a block diagram that illustrates the complete row source-based physical plan for a parallel hash-join with hash redistribution and a serial left-input as generated by the parallelization pass. Specifically, FIG. 2 shows the complete physical row source based plan corresponding to a parallel hash-join with left input serial (e.g. because it is too small to benefit from parallelism). The QC executes the Parallelizer row source and the serial left DFO (a serial scan). One set of slaves executes DFO1 (the parallel scan) and the other set of slaves executes DFO2 (the parallel hash-join). The PX-SEND and PX-RECEIVE row sources are added at DFO boundaries to implement the hash-redistribution Table Queue for rows fetched from the serial or parallel scan and sent to the parallel hash-join. As illustrated, the complete plan is provided to each of the slave processes that will participate in a part of the plan. Because each slave has access to the compiled plan, the need of an intermediate language for parallel subplans is avoided. Instead the QC and all slaves use the same parallel execution plan.

Communicating the Complete Plan

According to one embodiment, the complete plan is communicated by sharing the same physical copy of the plan when the slaves and QC run on the same node, and by linearizing and shipping the original SQL statement to remote nodes participating in the execution. On each remote node, the original statement is delinearized, reconstructed, and built into the cursor by one slave, and shared by all others on the same node. Alternatively, a separate copy of the complete execution plan may be sent to remote nodes by linearizing the plan into a predetermined format, for example.

Sharing the complete execution plan with the slave nodes improves the manageability and monitoring of parallel features in radical ways since all parallel constructs are expressed in the physical plan as row sources. Interesting parallel execution statistics (e.g. memory usage, number of messages, temp-space usage, network bandwidth, load skew) are all available in the row sources of the shared plan across all slaves and can be aggregated either live (for progress monitoring) or after a query finishes.

In addition, sharing the complete execution plan makes parallelization of new physical operators much easier and less error-prone, since the database server does not have to support an intermediate language on slaves, but only needs to define data distribution, clumping and DFO boundaries for the corresponding new row sources during plan compilation.

Further, sharing the complete execution plan improves code maintenance and debugging capability and reduces the memory usage associated with intermediate representations. Specifically, as discussed above, the QC and all slaves share or use the same parallel single cursor. At execution time, the QC only has to send control information to slaves to schedule the various DFOs (illustrated by the arrows in FIG. 2). Slaves scanning an object request and receive object fragment (granule) information via the granule iterator row source controlled by the QC (executing the parallelizer row source). Dynamic load balancing happens by the rate at which various slaves consume granules they receive from the QC and generate data to be sent to the consuming DFO.

Communicating the Complete Plan in Multiple-Server Systems

As mentioned above, slaves on the same database server as the QC will usually share the cursor generated by the QC (the "master cursor"), and thereby share access to the same parallel plan (the "master plan"). However, slaves on other database servers ("remote servers") are typically not able to directly access the volatile memory containing the master cursor. Thus, according to one embodiment, slaves on remote servers ("remote slaves") perform a hard parse of the original statement, and only participate in execution of the parallel query if the remote slaves generate a plan that is equivalent to the master plan.

According to one embodiment, techniques are provided to ensure that the remote slaves on a remote server participate in execution of the parallel query if and only if the parallel plan built at the remote server (the "remote plan") is equivalent to the master plan. To increase the likelihood that remote slaves generate an equivalent plan, sufficient information is sent over to the remote slaves to make the SQL compilation process behave as on the QC. If a remote slave does not generate an equivalent plan, the remote slave will not join the parallel query. The parallel query uses only the slaves which choose to join. Thus, it is possible to have a situation in which no slaves join the parallel query. Under such circumstances, the query is executed serially.

Verifying Correctness of Remote Instances of the Plan

Unfortunately, it is possible for a remote node to compile the original statement in a manner that produces a remote plan that is sufficiently different from the master plan. Under such circumstances, use of the remote plan would lead to errors. Therefore, according to one embodiment, the correctness of such remote plans is determined by (1) generating one or more signatures based on the contents of the master plan, (2) generating one or more signatures based on the contents of each remote plan, and (3) comparing the signatures of the master plan against the signatures of each of the remote plans. If the signatures of a remote plan do not match the signatures of the master plan, then the remote plan is considered incorrect. Consequently, the slaves that would otherwise have used the incorrect remote plan do not participate in the execution of the query.

It is possible for some portions (e.g. serial subtrees in the plan) of a remote execution plan to differ from the corresponding portions of the local execution plan without affecting the correctness of the result. For example, in a serial part of the plan, a full table scan of a table T in the plan may be compiled on one server versus a serial index scan of the same table T in the plan for the same statement compiled on another server. Since the QC (not the slaves) will execute the scan of table T in the execution of the global plan, the database server does not need to ensure that the plan signatures consider that part of the plan. However, in another embodiment, the database server could decide that serial parts of the plan are executed on a single slave, and not on the QC. Under these circumstances, the database server includes the serial parts of the plan in the signature computation. Therefore, according to one embodiment, the signatures are generated only on those portions of the execution plan that must match in order to ensure correctness of the operation.

According to one embodiment, to verify that a given piece of a remote plan is identical to the corresponding piece of the master plan, a "parallel plan signature" is computed based on the logical properties of the query plan. In one embodiment, the parallel plan signature is an array of checksums, each computed by traversing the plan and computing an internal hash function based on each of the following logical properties of each node or subtree within the plan.

1. Node-type for each node. Examples of node types are FULL TABLE SCAN, INDEX SCAN, HASH-JOIN, UPDATE, INSERT (i.e. a node represents the physical execution of a SQL operation like scan, join, update, etc).
2. Output row vector of each node. The row-vector is the set of expressions being outputted from each node in the physical execution plan as data flows through the tree bottom up. For example, the plan for a statement SELECT a, b+c FROM tab could be a single node of type FULL TABLE SCAN (of tab) and the row-vector of this node could be the expression <a, b+c>.
3. Number and type of predicates being evaluated on each node
4. Special constructs used to control or optimize parallelism which are associated with each node. First, a construct called granule iterator can be used to define horizontal partitioning of the base objects (table or index) so as to generate pieces of the objects which are worked on in parallel by different slaves. A granule is a construct for data-mapping to slaves for improving throughput and load-balancing. A granule can be of different types—e.g. block-id ranges for parallel full table scan, partition for full partition-wise join. Second, a construct called slave-mapper can be used to constrain data distribution across slaves (e.g. only a subset of slaves and not all slaves can work on one partition of a table) so as to reduce interconnect traffic when the statement is executed in parallel across a cluster of nodes. Slave mapper is a construct for optimizing or minimizing usage of resources like interconnect bandwidth, memory buffer and locks. The information in the granule and slave-mapper constructs, if any, in each node can be used to compute the signature. Similarly, other constructs associated to each node and used in the correctness or performance parallel execution of a query plan, can be used in the signature computation.
5. Parallel shape of the tree (number of PX nodes, number of DFO's)
6. Number and size of user binds On the QC, this parallel plan signature is computed after physical compilation and stored in the parallel cursor context. According to one embodiment, the parallel plan signature of the master plan is sent over to the slaves as part of the parse message. Once a slave does a hard parse, the slave computes its local plan signature and compares the local plan signature to the one received from the QC. If the signatures match, the slave joins the slave group to participate in execution of the parallel query. If the signatures do not match, then the slave does not join.

In the embodiment described above, the signatures for the master plan are sent to the remote nodes, where they are compared to the corresponding signatures of the remote plans. However, in an alternative embodiment, each remote server may send the signatures for its remote plan to the QC, and the QC can perform the comparisons between the signatures of the master plan and the corresponding signatures of the remote plans.

By taking into account enough logical properties of the plan, the chance of the signature being the same even if the slave gets a different plan, is statistically insignificant.

Increasing the Chance of Matching Signatures

Certain information, such as the original statement and the values of any bind variables, are sent to slaves to ensure correct parsing and execution of the statement. However, this information does not guarantee that a remotely generated execution plan will be usable. It is inefficient to have remote execution plans generated merely to later determine that they and their corresponding slaves cannot be used. Therefore, according to one embodiment, additional information is sent to remote nodes, along with the original statement and the values of any bind variables, in order to increase the chances that the remotely generated instance of the execution plan will be sufficiently similar to the local plan. According to one embodiment, such additional information includes certain optimizer parameters and statistics. By taking this information into account, the optimizer on the remote nodes are more likely to generate remote execution plans that can be used by remote slaves to correctly perform portions of the parallel operation.

Statistics Communicated to Slaves

As mentioned above, by communicating certain statistics to slave processes, the likelihood that the slave processes will build a remote plan that is equivalent to the master plan is increased. According to one embodiment, two kinds of statistics which are used by the optimizer in costing plans, are propagated from the QC to the slaves: Extent Map statistics and Dynamic Statistics.

Extent Map statistics may include, for example, certain pieces of information about each un-analyzed object in the query. An un-analyzed object is an object for which no explicit statistics collection has been done by the user (e.g. using an analyze object statement) and the statistics saved in the dictionary for that object are usually default or non-deterministic. Such pieces of information may include, for example, the number of rows in the object, the number of blocks in the object, the average size of the rows of the object, etc.

Dynamic statistics may include, for example, those statistics generated by performing dynamic sampling (using recursive SQL) for base tables which have no statistics, or selectivities generated for inline views.

The results of sampling across multiple database servers can be different because of the randomness inherent in the sampling process. Different sampling results can cause remote plans to be different from master plans. Therefore, to reduce the chances of producing non-equivalent remote plans, the statistics produced by dynamic sampling operations performed on the QC are communicated to the slaves so that the sampling results used by the slaves mimic those produced at the QC.

Specifically, the results produced by dynamic sampling operations performed during query optimization usually include (1) the selectivity and (2) the cardinality of a single object, possibly constrained by a set of predicates. According to one embodiment, a "sampling signature" is generated for each dynamic sampling cursor generated and used during QC optimization. Such a signature may be generated, for example, by performing a hash function on the text of the cursor. The database server stores the cardinality and selectivity returned by that cursor in a list, using the sampling signature as the hash key. While sending the original statement over to a slave, this dynamic sampling list is also sent over. The slave saves the dynamic sampling list in an appropriate container in its private memory. Then, during query optimization on the remote server, whenever the remote slave builds a dynamic sampling cursor, the remote slave computes the signature of the dynamic sampling cursor and looks up the selectivity and cardinality from the dynamic sampling list, instead of actually executing the recursive SQL. In this way, the same dynamic statistics are used during the slave hard parse as were used during the construction of the master cursor.

Parameters Communicated to Slaves

According to one embodiment, various types of parameters are communicated to the slaves to increase the likelihood that the remote plans built by the remote slaves will be equivalent to the master plan. The types of parameters may include, for example, session, system and initialization parameters.

According to one embodiment, all the parameters used through the compilation phase are captured on the QC and propagated to the remote slaves that are asked to participate in the parallel execution of the query. Some examples of such parameters are: optimization parameters (e.g. complex_view_merging, query_unnesting, grouping_set_rewrite etc.), memory parameters (e.g. those used by the dynamic memory manager to decide on sort sizes), and machine parameters (e.g cpu_count, instance_count etc).

Hardware Overview

Figure 3:
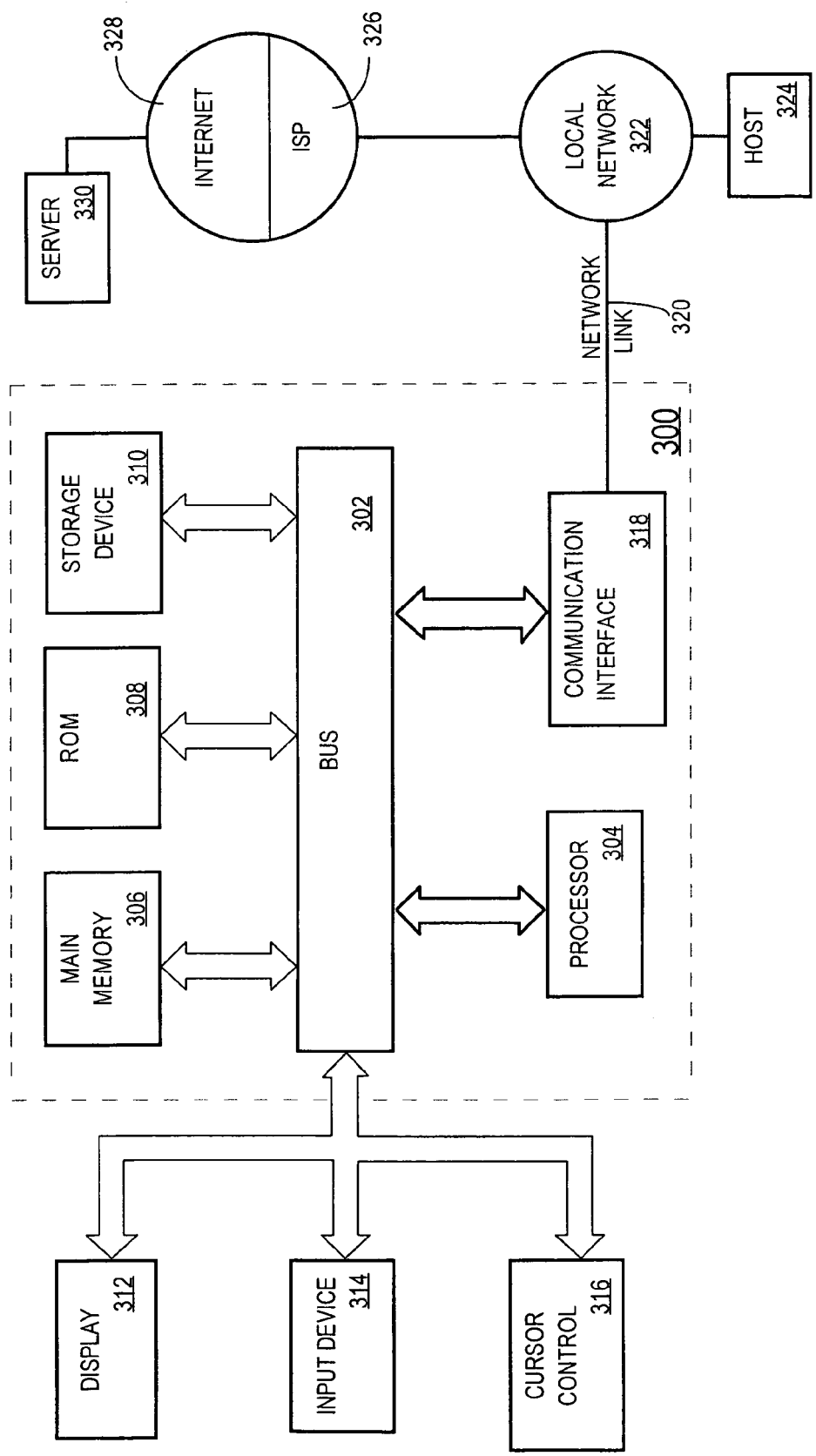
FIG. 3 is a block diagram illustrating a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hardwired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing a database statement within a multiple-server system, the method comprising the steps of:
   receiving the database statement at a first database server;
   determining that at least one operation required by the database statement can be parallelized;
   within the first database server, generating a master plan about how to execute the database statement;
   generating a first set of one or more signatures based on the master plan;
   within a second database server, generating a remote plan about how to execute the database statement;

generating a second set of one or more signatures based on the remote plan;

comparing the first set of one or more signatures to the second set of one or more signatures to determine whether the remote plan is equivalent to the master plan; and if the remote plan is equivalent to the master plan, then one or more slaves on the second database server using said remote plan to participate in parallel execution of the at least one operation;

wherein the remote plan is equivalent to the master plan if and only if use of the remote plan by the one or more slaves, while the one or more slaves participate in parallel execution of the at least one operation, will produce correct results for said at least one operation.

2. The method of claim 1 wherein, if the remote plan is not equivalent to the master plan, then no slaves on the second database server participate in parallel execution of the at least one operation.

3. The method of claim 1 wherein:

the method further comprises sending the first set of one or more signatures from the first database server to the second database server; and the step of comparing the first set of one or more signatures to the second set of one or more signatures is performed on the second database server.

4. The method of claim 1 wherein:

the method further comprises sending the second set of one or more signatures from the second database server to the first database server; and the step of comparing the first set of one or more signatures to the second set of one or more signatures is performed on the first database server.

5. The method of claim 1 wherein:

the step of generating a first set of one or more signatures includes computing a first set of one or more hash values based on logical properties of one or more nodes within the master plan; and the step of generating a second set of one or more signatures includes computing a second set of one or more hash values based on logical properties of one or more nodes within the remote plan.

6. The method of claim 1 wherein:

the first set of one or more signatures is generated based on logical properties of one or more nodes within the master plan; and the second set of one or more signatures is generated based on the same logical properties of one or more nodes within the remote plan.

7. The method of claim 6 wherein the logical properties include characteristics of an output row vector of each node of the one or more nodes.

8. The method of claim 6 wherein the logical properties include the node-type of each node of the one or more nodes.

9. The method of claim 6 wherein the logical properties include number and type of predicates that are to be evaluated at each node of the one or more nodes.

10. The method of claim 6 wherein the logical properties include parallelism information related to one or more of data-mapping, correctness, load-balancing and optimization of metrics, associated with each node of the one or more nodes.

11. The method of claim 6 wherein:

the master plan is structured as a first tree, and the first set of signatures is based, at least in part, on the parallel shape of the first tree; and the remote plan is structured as a second tree, and the second set of signatures is based, at least in part, on the parallel shape of the second tree.

12. The method of claim 6 wherein the first set of signatures and the second set of signatures are based, at least in part, on number and size of user binds associated with the database statement.

13. The method of claim 1 wherein:

the first database server sends a parse message to the second database server to cause the second database server to construct the remote plan based on the database statement; and the first set of one or more signature is sent from the first database server to the second database server with the parse message.

14. The method of claim 1 wherein both the master plan and the remote plan are complete plans for executing the database statement.

15. The method of claim 1 wherein:

the first database server sends to the second server optimizer parameters, used by the first database server to generate the master plan; and the second database server generates the remote plan for the database statement based, at least in part, on the optimizer parameters.

16. The method of claim 1 wherein:

the first database server sends to the second database server extent map statistics, used by the first database server to generate the master plan; and the second database server generates the remote plan for the database statement based, at least in part, on the extent map statistics.

17. The method of claim 1 wherein:

the first database server sends to the second database server dynamic statistics, used by the first database server to generate the master plan; and the second database server generates the remote plan for the database statement based, at least in part, on the dynamic statistics.

18. The method of claim 1 wherein:

the first database server sends to the second database server information about how many rows are in an un-analyzed object in the database statement, used by the first database server to generate the master plan; and the second database server generates the remote plan for the database statement based, at least in part, on the information.

19. The method of claim 1 wherein:

the first database server sends to the second database server information about how many blocks are in an un-analyzed object in the database statement, used by the first database server to generate the master plan; and the second database server generates the remote plan for the database statement based, at least in part, on the information.

20. The method of claim 1 wherein:

the first database server sends to the second database server information about an average size of rows in an un-analyzed object in the database statement, used by the first database server to generate the master plan; and the second database server generates the remote plan for the database statement based, at least in part, on the information.

21. The method of claim 1 wherein:

the first database server sends to the second database server dynamic sampling information, used by the first database server to generate the master plan; and the second database server generates the remote plan for the database statement based, at least in part, on the dynamic sampling information.

22. The method of claim 1 wherein:
the first database server sends to the second database server selectivity information for one or more inline views within said database statement, used by the first database server to generate the master plan; and
the second database server generates the remote plan for the database statement based, at least in part, on the selectivity information.

23. The method of claim 1 further comprising the steps of:
the first database server generating a sampling signature for each dynamic sampling cursor used during generation of said master plan;
storing, in a dynamic sampling list, a cardinality and selectivity for each of said dynamic sampling cursors;
communicating the sampling list to the second database server;
the second database server using the sampling signature for each of said dynamic sampling servers as a key into the sampling list to obtain the cardinality and selectivity for each of said dynamic sampling cursors; and
the second database server generating the remote plan based, at least in part, on the cardinality and selectivity of each of said dynamic sampling cursors.

24. A machine-readable medium carrying one or more sequences of instructions which, when executed by one or more processors, causes the one or more processors to perform the method recited in claim 1, wherein the machine-readable medium is one of a volatile medium or a non-volatile medium.

25. A machine-readable medium carrying one or more sequences of instructions which, when executed by one or more processors, causes the one or more processors to perform the method recited in claim 2, wherein the machine-readable medium is one of a volatile medium or a non-volatile medium.

26. A machine-readable medium carrying one or more sequences of instructions which, when executed by one or more processors, causes the one or more processors to perform the method recited in claim 3, wherein the machine-readable medium is one of a volatile medium or a non-volatile medium.

27. A machine-readable medium carrying one or more sequences of instructions which, when executed by one or more processors, causes the one or more processors to perform the method recited in claim 4, wherein the machine-readable medium is one of a volatile medium or a non-volatile medium.

28. A machine-readable medium carrying one or more sequences of instructions which, when executed by one or more processors, causes the one or more processors to perform the method recited in claim 5, wherein the machine-readable medium is one of a volatile medium or a non-volatile medium.

29. A machine-readable medium carrying one or more sequences of instructions which, when executed by one or more processors, causes the one or more processors to perform the method recited in claim 6, wherein the machine-readable medium is one of a volatile medium or a non-volatile medium.

30. A machine-readable medium carrying one or more sequences of instructions which, when executed by one or more processors, causes the one or more processors to perform the method recited in claim 7, wherein the machine-readable medium is one of a volatile medium or a non-volatile medium.

31. A machine-readable medium carrying one or more sequences of instructions which, when executed by one or more processors, causes the one or more processors to perform the method recited in claim 8, wherein the machine-readable medium is one of a volatile medium or a non-volatile medium.

32. A machine-readable medium carrying one or more sequences of instructions which, when executed by one or more processors, causes the one or more processors to perform the method recited in claim 9, wherein the machine-readable medium is one of a volatile medium or a non-volatile medium.

33. A machine-readable medium carrying one or more sequences of instructions which, when executed by one or more processors, causes the one or more processors to perform the method recited in claim 10, wherein the machine-readable medium is one of a volatile medium or a non-volatile medium.

34. A machine-readable medium carrying one or more sequences of instructions which, when executed by one or more processors, causes the one or more processors to perform the method recited in claim 11, wherein the machine-readable medium is one of a volatile medium or a non-volatile medium.

35. A machine-readable medium carrying one or more sequences of instructions which, when executed by one or more processors, causes the one or more processors to perform the method recited in claim 12, wherein the machine-readable medium is one of a volatile medium or a non-volatile medium.

36. A machine-readable medium carrying one or more sequences of instructions which, when executed by one or more processors, causes the one or more processors to perform the method recited in claim 13, wherein the machine-readable medium is one of a volatile medium or a non-volatile medium.

37. A machine-readable medium carrying one or more sequences of instructions which, when executed by one or more processors, causes the one or more processors to perform the method recited in claim 14, wherein the machine-readable medium is one of a volatile medium or a non-volatile medium.

38. A machine-readable medium carrying one or more sequences of instructions which, when executed by one or more processors, causes the one or more processors to perform the method recited in claim 15, wherein the machine-readable medium is one of a volatile medium or a non-volatile medium.

39. A machine-readable medium carrying one or more sequences of instructions which, when executed by one or more processors, causes the one or more processors to perform the method recited in claim 16, wherein the machine-readable medium is one of a volatile medium or a non-volatile medium.

40. A machine-readable medium carrying one or more sequences of instructions which, when executed by one or more processors, causes the one or more processors to perform the method recited in claim 17, wherein the machine-readable medium is one of a volatile medium or a non-volatile medium.

41. A machine-readable medium carrying one or more sequences of instructions which, when executed by one or more processors, causes the one or more processors to perform the method recited in claim 18, wherein the machine-readable medium is one of a volatile medium or a non-volatile medium.

42. A machine-readable medium carrying one or more sequences of instructions which, when executed by one or more processors, causes the one or more processors to perform the method recited in claim 19, wherein the machine-readable medium is one of a volatile medium or a non-volatile medium.

43. A machine-readable medium carrying one or more sequences of instructions which, when executed by one or more processors, causes the one or more processors to perform the method recited in claim 20, wherein the machine-readable medium is one of a volatile medium or a non-volatile medium.

44. A machine-readable medium carrying one or more sequences of instructions which, when executed by one or more processors, causes the one or more processors to perform the method recited in claim 21, wherein the machine-readable medium is one of a volatile medium or a non-volatile medium.

45. A machine-readable medium carrying one or more sequences of instructions which, when executed by one or more processors, causes the one or more processors to perform the method recited in claim 22, wherein the machine-readable medium is one of a volatile medium or a non-volatile medium.

46. A machine-readable medium carrying one or more sequences of instructions which, when executed by one or more processors, causes the one or more processors to perform the method recited in claim 23, wherein the machine-readable medium is one of a volatile medium or a non-volatile medium.

* * * * *

UNITED STATES PATENT AND TRADEMARK OFFICE
CERTIFICATE OF CORRECTION

PATENT NO.         : 7,340,452 B2
APPLICATION NO. : 10/901411
DATED              : March 4, 2008
INVENTOR(S)        : Ghosh et al.

It is certified that error appears in the above-identified patent and that said Letters Patent is hereby corrected as shown below:

In column 8, line 37, after "node" insert -- . --.

In column 8, line 61, after "DFO's)" insert -- . --.

In column 8, line 62, after "binds" insert -- . --.

In column 10, line 43, delete "(e.g" and insert -- (e.g. --, therefor.

Signed and Sealed this

Twenty-seventh Day of October, 2009

David J. Kappos
*Director of the United States Patent and Trademark Office*